United States Patent  [11] 3,627,568

| [72] | Inventors | John W. Padgett  Bernardsville;  Sherman T. Van Esselstyn, Upper Montclair, both of N.J. |
|---|---|---|
| [21] | Appl. No. | 653,625 |
| [22] | Filed | July 17, 1967 |
| [45] | Patented | Dec. 14, 1971 |
| [73] | Assignee | Moore & Munger  New York, N.Y. |

[54] THERMOPLASTIC COATING FOR MOLDABLE NYLON CARPETS, AND METHOD OF MANUFACTURE
15 Claims, No Drawings

[52] U.S. Cl........................................................ 117/21,
117/161 UF, 117/161 UC, 117/138.8 N, 161/67, 260/28.5 AV
[51] Int. Cl........................................................B44d 1/094,
B32b 27/08
[50] Field of Search............................................ 117/138.8
N, 168, 161 UH, 161 UC, 98, 21; 260/28.5; 161/67

[56] References Cited
UNITED STATES PATENTS
| 3,503,777 | 3/1970 | Kappas et al. | 117/21 |
| 3,103,448 | 9/1963 | Ross | 117/138.8 N |
| 3,117,101 | 1/1964 | Moyer | 117/168 |
| 3,171,825 | 3/1965 | Mark | 260/28 |
| 3,335,645 | 8/1967 | Eisenberg | 117/168 |
| 3,353,994 | 11/1967 | Welsh et al. | 117/98 |

Primary Examiner—William D. Martin
Assistant Examiner—Sadie L. Childs
Attorney—Kenyon & Kenyon Reilly Carr & Chapin ABSTRACT: A normally granular free-flowing thermoplastic composition for coating moldable nylon carpets which comprises a major proportion of a relatively high-viscosity polyolefin, such as polyethylene, and a minor proportion of a mixture of relatively polar and relatively nonpolar lower viscosity polymers or saturated hydrocarbons, such as, respectively, ethylene vinyl acetate and Fischer-Tropsch wax, the polyolefin having a density of between about 0.900 and .940 and a melt index of 70 or less, and the mixture of polar and relatively nonpolar hydrocarbons having, when taken together, a melting point of not less than 190° F. and a viscosity at 125° C. not exceeding 1000 centipoises.

Also, nylon carpeting which has been at least partially coated or impregnated, as by fluxing, with such a composition.

Also, a process for preparing such a composition which includes melt-blending, solidifying and powdering the polar and relatively nonpolar components, and thereafter dry-mixing these with the polyolefin.

THERMOPLASTIC COATING FOR MOLDABLE NYLON CARPETS, AND METHOD OF MANUFACTURE

This invention relates to composition for coating carpet materials, such as molded automobile carpeting. More particularly, the invention involves a polymeric composition for improving the wear characteristics of carpeting having a predominant amount of polyamide (nylon) fiber.

It is a known practice to put a back coating on carpeting materials to hold the tufts, to improve wear characteristics of the carpet, and to provide it with moldable qualities.

The U.S. Pat. No. 3,211,600, for example, describes the manufacture of contoured carpeting for automobiles wherein a coating of polyethylene is applied to the backing so as to impart moldable qualities for contouring the carpet to desired shapes. Other proposals have provided coating compositions which materially improve the wear characteristics of the carpet, while reducing processing costs.

Despite these improvements in the art of carpet coating, it has been found that the wear characteristics of certain carpeting materials, especially from the standpoint of pilling and fuzzing, are not as satisfactory as could be desired. In particular, it has been found the pilling and fuzzing characteristics of carpets composed predominantly of nylon (polyamide) fibers can be significantly improved by coating them with certain polymeric compositions of polar character.

It is therefore an object of the present invention to provide an improved thermoplastic composition for coating carpeting made predominantly of nylon fiber.

It is a further object of the present invention to provide a coated nylon-containing carpeting material with improved pilling and fuzzing characteristics. We have found that these and other objects, as hereinafter more fully set forth, can be obtained by coating a nylon carpet with a composition comprising a polyolefin of relatively high viscosity, a saturated solid hydrocarbon of relatively lower viscosity and a solid hydrocarbon of relatively lower viscosity which is polar.

The polyolefin component of the composition is preferably a high-molecular weight polyethylene. The density of such a polymer should be between about 0.900–0.940, and is preferably about 0.920–0.925. The melt index should not exceed 70 and is best selected within the range of 5 and 22 and preferably between 5 and 12.

The relatively low-viscosity saturated hydrocarbon component is characterized by a melting point of not less than 190° F. and a viscosity not exceeding 1,000 centipoises at 125° C.

Various saturated hydrocarbon waxes are eminently suitable as the low-viscosity saturated hydrocarbon material in this invention. Such a wax can be selected from the essentially nonpolar waxes in the class of a petroleum wax, a mineral wax, or a synthetic Fischer-Tropsch wax, the latter being preferred. A typical good Fischer-Tropsch wax is one having an ASTM melting point of 215° F. and an ASTM penetration (one-tenth millimeter, 100 g., 5 sec., at 77° F.) of 1.5. Best results are obtained with chemically inert waxes having neutralization, saponification and bromine values of zero. A low-molecular weight polymerized olefin such as polymerized ethylene can be used in lieu of a hydrocarbon wax if desired provided the viscosity and melting point are within the limits set forth above.

The properties desired in the low-viscosity saturated hydrocarbon, in addition to the melting point and viscosity ranges already mentioned, are good flow characteristics in powder form, good color, oxidation stability, and good strength properties in blends with the relatively higher viscosity polyolefin.

The third essential component of the blend, the polar hydrocarbon, may be derived from a nonpolar saturated or unsaturated hydrocarbon of relatively low viscosity. Consequently, the class of materials suitable for this third component embraces those suitable for the second component, with the exception that the third component is highly polar whereas the second component is relatively nonpolar. In this respect, the third component may be derived from a solid saturated hydrocarbon such as a wax selected from the group comprising petroleum wax, mineral wax, vegetable wax or a synthetic Fischer-Tropsch wax. However, all such materials must be naturally polar (as, for example, in the case of Carnauba or Montan waxes) or have been treated or otherwise modified (as, for example, in the case of Fischer-Tropsch wax) to make them polar. Modification, for instance, by oxidation of natural or synthetic nonpolar waxes of the kind suitable for the second component of the novel composition, yields a polar material that is suitable as the third component. It has been found that the wax-compatible polymer ethylene vinyl acetate is particularly suitable as the polar hydrocarbon component. Polar characteristics of the hydrocarbon component may also be attributed to unsaturation in the molecule, or to ring formation, or both. When polarity is attributable, at least in part, to the introduction of oxygen in the molecule, the so-called polar hydrocarbon component is not, strictly speaking, a hydrocarbon. Nonetheless, such a compound is with the exception of the introduction of such polar element, composed of hydrogen and carbon and, as such, is referred to herein as a polar hydrocarbon.

No matter what particular compound is selected as the third component, the degree of polarity must be at least sufficient to permit the component to wet-out on and adhere to the polyamide fibers in the carpeting material. The point at which any selected polar hydrocarbon wets-out on the polyamide fibers may be readily observed, and may also be measured by contact-angle analyses.

The selection of a suitable polar hydrocarbon is generally limited, as is the saturated relatively nonpolar hydrocarbon, by the criteria that it be normally solid and have a melting point in excess of 190° F. and a viscosity (at 125° C.) of no more than 1,000 centipoises. However, either the polar or nonpolar hydrocarbon component may have a melting point and/or viscosity outside the above-mentioned ranges, provided that the melting point and viscosity of the combination of the two components taken together, in any given composition in accordance with this invention, is within the stated ranges.

The composition of the present invention is best applied to the carpeting in powdered form as described with more particularity hereinafter. Only in this manner are really superior physical qualities imparted to the completed carpet. To this end it is essential that the composition be finely divided, yet readily flowable, with little or no tack. Tackiness, large particles, too many fines or a tendency to ballup, can cause severe problems. To avoid such difficulties, it is best that the particle size distribution be controlled so as to eliminate excessively large or excessively small particles. A typical satisfactory particle size distribution is as follows:

| U.S. Standard Sieve | % Retained on Screen |
| --- | --- |
| 16 | 0 |
| 20 | 5 |
| 30 | 40 |
| 50 | 30 |
| 70 | 20 |
| 100 | 4 |
| In Pan | 1 |

Although the presence of a polar hydrocarbon of relatively low viscosity has been found necessary to adequately coat the fibers of the polyamide material, such a compound does not of itself possess a physical character permitting of free-flowing application as a powder. It has been found, however, that a suitable mixture of a nonpolar saturated hydrocarbon, i.e., the second component of the inventive composition, with the polar saturated hydrocarbon will permit the mixture as a whole to be susceptible to application as a free-flowing particulate powder while still retaining the effective polyamide-coating characteristics of the polar component.

Preferably, therefore, the two relatively low-viscosity components are formed into a single granular free-flowing composition by hot-melting them together to form an intimate dispersion one with the other, and thereafter permitting the blend to cool, solidify and be broken up into particulate form. This latter operation can be accomplished readily, for example, by picking up a film of the hot-melt blend on a rotating drum partially immersed in the hot-melt blend, allowing the film to dry on the rotating drum (which may be cooled, if necessary) and thereafter removing the dried film as flakes by means of a doctor blade. The flakes can then be powdered or granulated in any suitable fashions, as, for example, by impeller milling.

The resulting powdered blend of polar and nonpolar compounds may be thereafter applied in a dry-blend with the powdered polyolefin, or as a first coating over which the polyolefin powder is independently applied.

The procedural steps by which heat dispersible, i.e., thermoplastic compositions, may be applied to carpeting material are known to those skilled in the art, and do not require elaboration here. In brief, however, in the usual coating operation a roll of woven, tufted and dyed carpeting material is unwound so that the jute scrim, or "underside," of the carpet faces upward. A coating of the thermoplastic powder is then metered onto the jute scrim (in amounts of about 8–12 oz./sq. yd.) and is heated to form a continuous layer. The fused thermoplastic partially enters the interstices of the scrim, and, upon cooling and hardening, locks the tufts of the carpeting material to the scrim web.

Thereafter, a cushioning layer of jute is applied to the underside of the carpet and the whole is molded into the desired shape. Conveniently, this is accomplished by reheating the coating on the underside of a cut piece of carpet until it becomes plastic and then applying a jute cushioning pad thereto, while simultaneously forming the whole into a desired shape in a cold mold. When released from the mold, the cooled carpet is complete and retains the shape corresponding to the contours desired.

In the circumstances of the present invention wherein the thermoplastic three-component composition is applied as a single granular blend, the continuous application may be described as follows:

A nylon carpeting material is continuously unwound from a source such that the backing of the carpet, i.e., the jute scrim through which the tufts of nylon are woven, faces upwardly toward a dispensing means for the composition. This dispensing means may be a hopper which continuously dispenses the powdered blend uniformly across the backing. Thereafter the powdered blend according to the invention is heat-melted such that is penetrates into the backing, and at least partially into the tufts of the carpet where it coats the fibers. This is accomplished, for instance, by passing the carpet material with the powder thereon underneath the heating element, such as radiant heating lamps, which serve to flux the powder and permit the molten blend to flow and to penetrate the backing. The relatively low-viscosity saturated hydrocarbon components naturally flow more quickly and further into the carpet than does the relatively high-viscosity polyolefin thereby forming a composition gradient through the carpet. The deep penetration of the low-viscosity components and their unique affinity for the nylon fibers results in a carpeting material that exhibits substantially improved wear characteristics, as will be shown hereinafter in the examples. At the same time, the polyolefin component penetrates less readily and serves to adequately adhere the tufts to the backing, where it forms a rather uniform coating. These effects are assured more particularly by squeezing the carpet while the compositions are still in a state of flux between the nip of cold pressure rollers in a manner which is already known. The treated carpeting material may thereafter be stored, or immediately cut, reheated and molded into suitable shapes in the manner already known. In this respect, see, for example, U.S. Pat. No. 3,211,600, which describes certain appropriate procedures for applying a thermoplastic composition to a carpeting material and thereafter the shaping of the carpet into automobile floor coverings.

In the case wherein the present composition is applied to the carpeting material in a stepwise manner, the procedures described above are used except that the relatively low-viscosity hydrocarbon components are initially applied together in powdered form to the carpet backing, as, for example, from an overlying hopper, and thereafter the relatively high-viscosity polyolefin component is applied on like manner from a second overlying hopper. Optionally, a heating element may be placed between the two feed hoppers so as to presoften the initial relatively low-viscosity hydrocarbon components before the polyolefin component is applied. These and other suitable procedures for applying the thermoplastic composition are described with more particularly in the copending application Ser. No. 572,348, filed on Aug. 15, 1966, by one of the present inventors and another.

Having thus described the nature of the novel composition and how the same may be used to prepare and treat the carpeting material to form improved carpeting for automobiles and the like, we hereinafter describe specific illustrative examples of compositions and treated carpets according to the present invention.

EXAMPLE 1

A hot-melt blend was prepared comprising 75 parts by weight of a synthetic Fischer-Tropsch wax having an ASTM melting point of 215° F., a congealing point of 205° F. and an ASTM penetration (one-tenth millimeter 100 g. 5 sec., at 77° F.) of 1.5 and 25 parts by weight of an ethylene vinyl acetate (prepared from about 32–30 percent (by weight) vinyl acetate and 68–70 percent ethylene) having a melt index of 120 and an density of 0.952. After solidifying and powdering, the composition was dry blended with a high-molecular weight polyethylene having a melt index of 8.0, in the ratio of 20 parts by weight of the EVA/wax composition to 80 parts by weight of the polyethylene.

The solid powdered composition was then applied uniformly to a carpet composed of DuPont BCF nylon and thereafter heated until fluxed, and then cold rolled in pressure rollers at a nip pressure of 156 pounds per linear inch. The resulting carpet passed the Ford Scrub test entitled "Bearding and Frosting Test for Automobile Carpets" and performed as follows:

A piece of carpet about 4 inches by 6 inches was mounted on a flat board base attached to a 1½-lb. weight and placed into a Flex Fold Tester (Research Designing Service, Inc., Centerline, Mich., manufacturer) such that the carpet pile with attached load could be reciprocally rubbed by cord cloth wire. The sample was examined after 200 cycles and rated objectively for pilling by a panel of three on an arbitrary scale running from 1.0 to 5.0 (4.0 and above is passing).

The resistance of the treated carpet to pilling was considered as good as a control specimen prepared by coating a carpet which had been previously coated with 6 ounces/sq. yd. of uncured rubber latex, with 8 oz./sq. yd. 20 melt index polyethylene. The treated carpet was significantly better than similar carpet which had been processed in like manner but had been coated only with polyethylene (20 melt index, 0.923 density).

Comparable results were obtained when the same composition of EVA/wax/polyethylene was applied to the carpet in a stepwise manner by first applying the powdered blend of EVA and wax, and thereafter applying the polyethylene.

Example 2

A powdered composition was formulated containing 80 percent polyethylene (20 melt index, 0.923 density), 15 percent Fischer-Tropsch wax (ASTM M.P. of 215° F.; penetration, one-tenth millimeter, 100 g., 5 sec., at 77° F. of 1.5) and 5 percent ethylene vinyl acetate (melt index 120, density 0.952).

This composition was applied to a BCF DuPont nylon-tufted carpet, heated to flux, and cold rolled between rollers at a nip pressure of 156 pounds per linear inch.

The same test was repeated for two other samples except that the relative percentages of polyethylene, EVA and Fischer-Tropsch wax in the composition were changed to 75/6.25/18.75 percent, respectively, for one such sample, and to 70/7.5/22.5 percent, respectively, for the other sample. All three samples were tested for Taber Wear, Taber Fuzz, Tuft Lock and Ford Scrub. The results of these tests are shown below in table 1, where they are compared with similarly processed control samples having (1) an equivalent weight coating composed entirely of the polyethylene component, and (2) an equivalent weight coating containing 20 percent Fischer-Tropsch wax and 80 percent polyethylene, but no polar component.

TABLE 1

| Sample, percent | | | Tuft lock,[1] lbs. (10 readings) | Ford scrub[2] | Taber wear[3] | Taber fuzz[4] |
|---|---|---|---|---|---|---|
| Olefin | Polar HC | Non-polar HC | | | | |
| 80 | 5 | 15 | 14.2 | 5.0 | Pass | Pass. |
| 75 | 6.25 | 18.75 | 11.8 | 4.8 | ...do | Do. |
| 70 | 7.5 | 22.5 | 11.4 | 5.0 | ...do | Do. |
| 100 | 0 | 0 | 13.4 | 2.5 | ...do | Fail. |
| 80 | 0 | 20 | 10.8 | 1.0 | ...do | Pass. |

[1] Pounds pull required to dislodge tuft from backing, as measured by Scott tensometer; acceptable lower limit for carpeting is 8 pounds.
[2] Procedure as in Example 1.
[3] Ford Laboratory Test Method BN 8-12: 2,000 cycles, 1,000 gms., H 18 wheel, and using as acceptable standard carpet coated with 6 o·./sq. yd. rubber latex and overcoated with 8 oz./sq. yd. 20 melt index polyethylene.
[4] Rated against same standard as in Taber wear test and after subjected to testing conditions of Taber wear test.

It is noted with respect to the above table that all three samples prepared according to the invention passed all the physical tests, whereas both control samples made in accordance with prior composition, failed in one respect or another. It is noteworthy, for instance, that although a carpet treated with 100 percent polyethylene exhibits good tuft lock (as would be expected) it scores far below the passing mark of 4.0 in terms of the Ford test for pilling, and fails the Taber Fuzz test as well.

Moreover, even the presence of 20 percent low-viscosity nonpolar saturated hydrocarbon wax shows no significant improvement in physical criteria (although machine processability is improved). It is therefore quite surprising to find that the presence of 5 percent low-viscosity polar hydrocarbon, instead of low-viscosity nonpolar hydrocarbon, yields a carpet with greatly improved physical character, as may be seen by comparing the Tuft Lock of 14.2 pounds with that of 10.8 pounds, and by comparing the perfect Ford Scrub rating of 5.0 with the very poor rating of 1.0.

EXAMPLE 3

The procedures of example 2 were repeated except that polyethylene of 5.0 melt index was used instead of polyethylene of 20.0 melt index. A control sample treated with a coating of 100 percent polyethylene of 5.0 melt index was prepared for comparative purposes. The samples were tested and the results obtained are shown below in table 2.

TABLE 2

| Sample percent | | | Tuft lock | Ford scrub | Taber wear | Taber fuzz |
|---|---|---|---|---|---|---|
| Olefin | Polar HC | Non-polar HC | | | | |
| 80 | 5 | 15 | 13.9 | 5.0 | Pass | Pass. |
| 75 | 6.25 | 18.75 | 13.3 | 4.5 | ...do | Do. |
| 70 | 7.5 | 22.5 | 12.4 | 4.0 | ...do | Do. |
| 100 | 0 | 0 | 15.5 | 3.8 | ...do | Fail. |

As may be seen from table 2, compositions containing from 20 to 30 percent combined low-viscosity components, wherein the amount of the polar component was about 25 percent, gave good results, particularly in terms of resistance to pilling, as compared to the control sample.

Example 4

A BCF nylon carpet was coated in the usual manner as described in example 1, by a granular coating composition prepared as follows: 3 parts by weight of nonpolar Fischer-Tropsch wax (ASTM melting point of 215° F.; ASTM penetration, one-tenth millimeter, 100 g. at 77° F. of 1.5) and 1 part of oxidized (polar) Fischer-Tropsch wax characterized by a congealing point of 190, a penetration (one-tenth millimeter, 100 g. 5 sec., at 77° F.) of 6.5, a softening point (Ring & Ball) of 97.5° C., a saponification value (mg. KOH/g. of 52, and an acid value (mg. KOH/mg.) of 28, were hot-melt blended, solidified, flaked and powdered. This composition was thereafter dry blended with 20.0 melt index polyethylene in the weight ratio of 1 to 3, respectively. The carpet coated with this composition exhibited a Tuft Lock of 14.2 pounds and a Ford Scrub rating of 4.7. It also passed the standards for Taber Fuzz and Taber Wear tests.

EXAMPLE 5

A BCF nylon carpet was coated as in example 4 except that in the granular coating composition the polar wax was substituted by an oxidized low-molecular weight polyethylene characterized by an acid number of 14, a penetration (one-tenth millimeter 100 g., 5 sec., 77° F.) of 2.2, a density of 0.940, a softening point (Ring & Ball) of 106° C. and an approximate molecular weight of 2500.

The carpet exhibited a Tuft Lock of 13.5 pounds, and a Ford Scrub rating of 4.0. It also passed the standard for Taber Wear and Taber Fuzz.

From the above examples it is evident that the present invention provides a carpet coating composition that is uniquely suited to the physical and chemical character of carpets composed predominantly of nylon (polyamide) fibers. It is essential in this respect that the composition have sufficient relatively high-viscosity polyolefin content, usually a predominant portion, to provide a satisfactory tuft lock, sufficient polar hydrocarbon to provide wetting-out of nylon fibers, and sufficient relatively nonpolar saturated hydrocarbon to maintain the low-viscosity components in a granular free-flowing nonadherent condition. The particular ratio of ingredients may vary somewhat depending on the choice of specific ingredients. In general, however, satisfactory compositions may be achieved by selecting the weight ratio of the relatively high-viscosity polyolefin to combined relatively low-viscosity hydrocarbons in the range of 95:5 to 55:45, respectively, and by selecting the weight ratio of polar hydrocarbon to nonpolar saturated hydrocarbon in the range of about 15:85 to 35:65, respectively. However, it is recognized that suitable compositions may be prepared outside these ranges, and the governing criteria for selection of rations for any given system is the empirical criteria discussed above.

What we claim is:

1. In the high-viscosity for manufacturing a moldable carpet having tufts composed essentially of nylon fibers, the steps of applying to a surface of said carpet a readily flowable, finely divided particulate powder composition consisting essentially of (1) at least 55 percent by weight of a relatively high-viscosity solid polyolefin having a density of about 0.900 to 0.940 and a melt index of 70 or less, and (2) 45 percent by weight or less of a mixture consisting essentially of a polar solid hydrocarbon containing polar groups selected from the class consisting of oxygenated, unsaturated, and cyclic radicals and a nonpolar solid saturated hydrocarbon selected from the group consisting of petroleum wax, mineral wax, synthetic Fischer-Tropsch wax and low-molecular weight polymerized olefin, said mixture being characterized by a viscosity of 1,000 centipoises or less at 125° C. and a melting point of 190° F. or more, the amount of the nonpolar hydrocarbon being sufficient to maintain the composition as a whole in a granular free-flowing condition at atmospheric conditions, and the amount of said hydrocarbon containing polar groups being sufficient to cause the composition as a whole to wet-out on nylon and adhere to fibers when contacted therewith under fluxing conditions, thereafter applying sufficient heat to flux said composition and render it sufficiently plastic to at least partially impregnate said carpet, and thereafter cooling said composition to the solid state.

2. The process according to claim 1 wherein the amount of said composition applied is sufficient to create a continuous coating of a solid thermoplastic material on the said surface of the carpeting.

3. The process according to claim 1 wherein, after the application of heat and while said composition is in a state of plastic flow, the carpeting material is squeezed between the nips of cold pressure rollers.

4. The process according to claim 1 wherein said relatively high-viscosity polyolefin is polyethylene.

5. The process according to claim 4 wherein the melt index of said polyethylene is between about 5 and 22.

6. The process according to claim 4 wherein the melt index of said polyethylene is between said 5 and 12.

7. The process according to claim 1 wherein the hydrocarbon containing polar groups is ethylene vinyl acetate copolymer.

8. The process according to claim 1 wherein the amount of solid relatively high-viscosity polyolefin in said composition is between about 70 to 80 percent by weight.

9. The process according to claim 1 wherein the weight ratio of polar solid hydrocarbon to nonpolar solid saturated hydrocarbon in said mixture is in the range of about 15:85 to 35:65.

10. The process according to claim 1 wherein the hydrocarbon containing polar groups is an oxidized Fisher-Tropsch wax.

11. In the process for manufacturing a moldable carpet having tufts composed essentially of nylon fibers, the steps of applying to a surface said carpet of a first readily flowable, finely divided particulate powder consisting essentially of a mixture of a polar solid hydrocarbon containing polar groups selected from the class consisting of oxygenated, unsaturated, and cyclic radicals and a relatively nonpolar solid saturated hydrocarbon selected from the group consisting of petroleum wax, mineral wax, synthetic Fischer-Tropsch wax and low-molecular weight polymerized olefin, said mixture being characterized by a viscosity of 1,000 centipoises or less at 125° C. and a melting point of 190° F. or more, the amount of the relatively nonpolar hydrocarbon being sufficient to maintain the mixture as a whole in a granular free-flowing condition at atmospheric conditions, and the amount of said hydrocarbon containing polar groups being sufficient to cause the mixture as a whole to wet-out on and adhere to nylon fibers when contacted therewith under fluxing conditions, thereafter applying to said surface of said carpet a second readily flowable, finely divided particulate powder consisting essentially of a relatively high-viscosity solid polyolefin having a density of about 0.900 to 0.940 and a melt index of 70 or less, the weight ratio of said second powder to said first powder being in the range of 95:5 to 55:45, thereafter applying sufficient heat to flux said powders and render them sufficiently plastic to at least partially impregnate said carpet, and thereafter cooling the plasticized composition to the solid state.

12. The process according to claim 11 wherein said relatively high-viscosity polyolefin is polyethylene having a melt index between about 5 and 22.

13. The process according to claim 11 wherein the weight ratio of said second powder to said first powder is in the range of 80:20 to 70:30.

14. The process according to claim 11 wherein subsequent to the step of applying said first powder and prior to applying said second powder to a surface of said carpet, there is applied sufficient heat to soften said first powder.

15. A carpeting material having a backing scrim and having therein tufts composed essentially of nylon fibers attached thereto, said scrim and tufts having a least a partial coating of a composition consisting essentially of (1) 55 percent by weight or more of a relatively high-viscosity solid polyolefin having a density of about 0.900 to 0.940 and a melt index of 70 or less, and (2) 45 percent by weight or less of a mixture consisting essentially of a polar solid hydrocarbon containing polar groups selected from the class consisting of oxygenated, unsaturated, and cyclic radicals, and a nonpolar solid saturated hydrocarbon selected from the group consisting of petroleum wax, mineral wax, synthetic Fischer-Tropsch wax and low-molecular weight polymerized olefin, said mixture being characterized by a viscosity of 1,000 centipoises less at 125° C. and a melting point of 190° F. or more, the proportion of said hydrocarbon containing polar groups in said composition being sufficient to cause the composition as a whole to wet-out on and adhere to nylon fibers when contacted therewith under fluxing conditions, the distribution of the components of said coating in said carpet being such that the concentration of the relatively high-viscosity polyolefin is higher in the coating on said scrim than in the coating on said nylon tufts, and, conversely, that the concentration of said mixture is higher in the coating on said nylon tufts then in the coating scrim backing.

* * * * *

UNITED STATES PATENT OFFICE
CERTIFICATE OF CORRECTION

Patent No. 3,627,568　　　　　　　　　Dated December 14, 1971

Inventor(s)　John W. Padgett and Sherman T. Van Esselstyn

It is certified that error appears in the above-identified patent and that said Letters Patent are hereby corrected as shown below:

Column 4, line 9, delete "for" and insert --from--.
Column 4, line 10, delete "on" and insert --in--.
Column 5, line 31, delete "8-12" and insert --8-2--.
Column 6, line 17, after "KOH/g" insert a closing parenthesis --)--.
Column 6, line 18, "mg" (second occurrence) should be deleted and insert --gm--.
Column 6, line 62, delete "high viscosity" and insert --process--
Column 7, line 26, delete "said" (second occurrence).
Column 8, line 39, insert --or-- before "less".
Column 8, line 50, insert --on said-- before "scrim".

Signed and sealed this 2nd day of May 1972.

(SEAL)
Attest:

EDWARD M. FLETCHER, JR.　　　　　　　ROBERT GOTTSCHALK
Attesting Officer　　　　　　　　　　Commissioner of Patents